April 23, 1957 R. F. HARGREAVES 2,789,401

DRUM SANDER

Filed July 16, 1956

INVENTOR.
ROBERT F. HARGREAVES
BY
Buckhorn, Cheatham + Blore
ATTORNEYS

United States Patent Office 2,789,401
Patented Apr. 23, 1957

2,789,401

DRUM SANDER

Robert F. Hargreaves, Portland, Oreg.

Application July 16, 1956, Serial No. 598,120

1 Claim. (Cl. 51—194)

The present invention relates to a sanding device and more particularly to a so-called drum sander.

It is an object of the invention to provide a sander drum having a new and improved arrangement for mounting the same upon a drive shaft.

It is another object of the invention to provide a sander drum mounting arrangement facilitating mounting of the drum upon drive shafts of various sizes.

A still further object is to provide a sander drum construction that will facilitate manufacture of the same.

Still another object is to provide an improved mounting arrangement for a sander drum that will assure the drum will run true and smoothly.

Other objects and advantages of the invention will become more apparent hereinafter.

In accordance with the illustrated embodiment of the present invention, there is provided a sander drum diametrically split into two half portions. The drum is provided with a frusto-conical hub and the half portions are secured together by a member having a bushing which fits within the aperture of the hub and which may be bored to fit shafts of various sizes, and having a flange with a conical surface to engage the frusto-conical surface of the hub to prevent separation of the half portions thereof.

For a more complete and detailed description of the invention, reference is made to the accompanying drawings, wherein.

Figure 1:
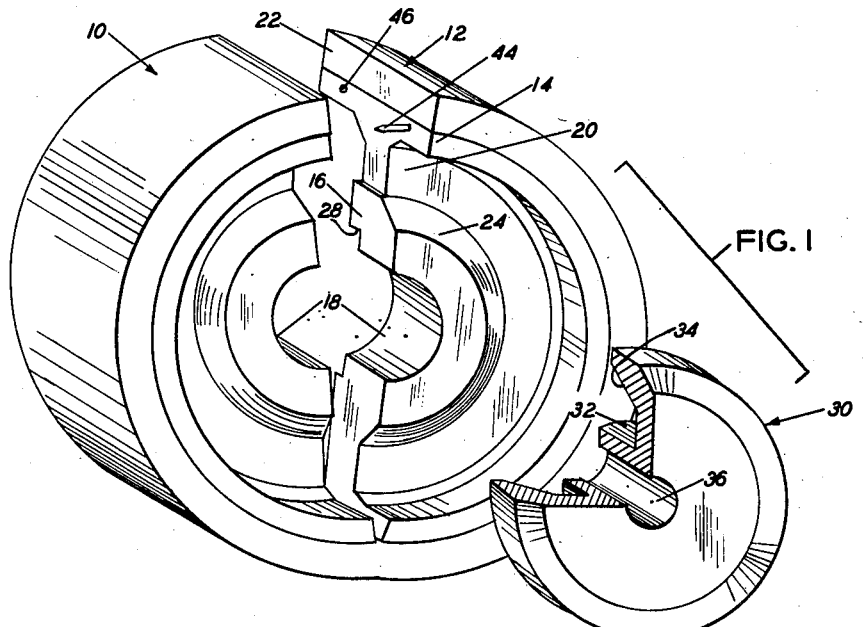
Fig. 1 is an exploded, perspective view showing the device of the invention, certain parts being broken away to show details thereof.

Referring more particularly to Fig. 1, the device of the invention comprises a drum formed of suitable material such as cast aluminum and divided diametrically into two mating sections 10, 12 which are substantially mirror images of one another. The drum defined by the sections 10, 12 includes a relatively wide rim portion 14, and a hub 16 defining a circular aperture 18 which is concentric with the rim, the hub being connected to the rim by a relatively thin web 20. Preferably, the rim 14 extends substantially equidistantly on opposite sides of the web 20, for reasons which will be explained.

Extending about the periphery of the rim 14 and secured thereto in any suitable manner, such as by vulcanizing, is a cover 22 formed of a strip of rubber or other suitable, resilient material. The strip or cover 22 extends circumferentially of the rim from a mating edge of one drum half to the adjacent edge of the other drum half. As shown in Fig. 1, the cover strip 22 serves to hinge the two drum halves 10, 12 together.

Figure 3:
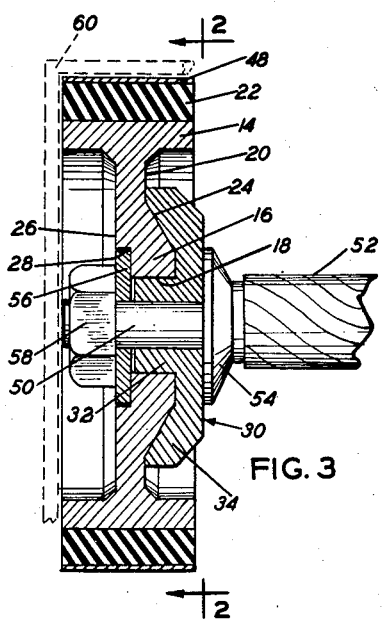
Fig. 3 is a sectional view of the device taken substantially along line 3—3 of Fig. 2 and showing an arrangement for mounting the device upon a drive shaft.

One face of the hub 16 is provided with a frusto-conical surface indicated at 24, while the other face 26 is substantially flat except for a washer receiving recess 28. The drum halves 10, 12 are adapted to be held in the mated position by a clamping member 30 including a bushing portion 32 which fits snugly within the aperture 18 and an integral flange portion 34 extending from one end of the bushing and defining a clamping cone which snugly engages the hub face 24, as best shown in Fig. 3, thus to prevent separation of the halves 10, 12. The bushing portion 32 is provided with an axial opening 36 which is bored to fit the shaft on which the drum is to be mounted.

Figure 2:
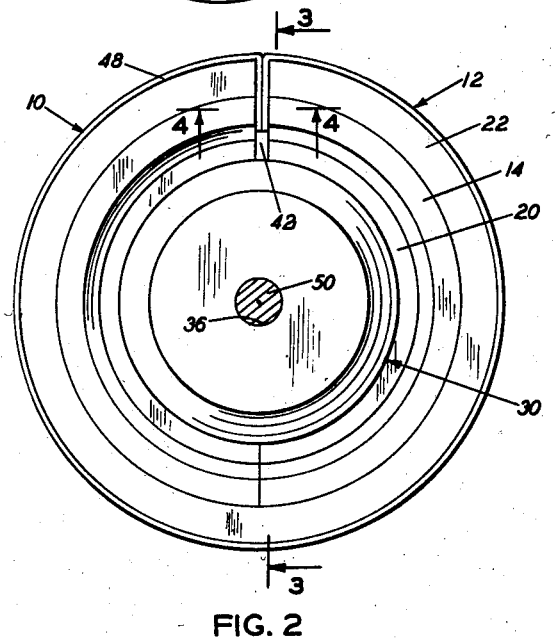
Fig. 2 is an elevational view of the device of the invention, looking in the direction of the arrows 2—2 of Fig. 3.
Figure 4:
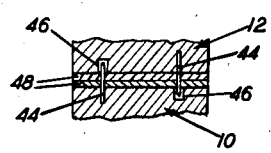
Fig. 4 is a fragmentary, sectional view taken substantially along line 4—4 of Fig. 2.

The face of each of the drum halves 10, 12 opposite the hinged side thereof is slightly relieved, as indicated at 42 in Fig. 2, and each half is provided with a projecting pin 44 and an aperture 46 for receiving the pin of the other half, as shown in Fig. 4. An abrasive strip 48 may be mounted on the periphery of the device by engaging one end thereof on the pin 44 of one drum half and winding the strip about the periphery of the cover 22 and impaling the opposite end of the strip on the pin 44 of the other drum half. The drum halves are then brought together, as shown in Fig. 2, and the locking member 30 mounted in place by inserting the bushing 32 into the aperture 18 and bringing the flange 34 into engagement with the hub.

The assembled device may be mounted on a spindle 50 of any suitable driving means such as a flexible drive shaft 52. Preferably the device is mounted on the shaft 50 with the locking member 30 abutting against a collar 54, or other suitable stop provided on the shaft, a washer 56 and a nut 58 or other suitable means being provided to engage the opposite face 26 of the drum and hold the drum upon the spindle. As indicated in Fig. 3, the recess 28 and the indentation of the hub face 26 affords clearance for the nut 58 and washer 56 so that they do not protrude beyond the edge of the rim 14 permitting the device to be used for sanding the corners of right-angled, bent members, as indicated in dotted lines at 60.

The positioning of the web 20 medially of the rim 14 is of advantage since it minimizes the amount of overhang of the rim. Sanding devices of the type of the invention are driven at high speeds and if the overhang of the rim is too great, the rim tends to flex which is undesirable.

The advantages of the illustrated arrangement for locking the drum halves together will be readily apparent. First of all, it eliminates the necessity of manufacturing the drum halves 10, 12 with apertures of various sizes since the locking members 30 can be provided with bushings having axial openings of the desired shaft sizes. Thus, manufacture and supply of the devices will be facilitated.

Moreover, the use of the locking member 30 with an axial opening to snugly engage the shaft 50 is of advantage since in sanding drums of this character, quite frequently grit or other foreign material will fall between the faces of the drum halves when the abrasive strip 48 is being mounted thereon. If the grit goes unobserved and the drum halves are brought together, the result will be that the aperture 18 will not be a perfect circle. Accordingly, if the drive shaft is inserted directly within each such an aperture, a loose fit results. This is undesirable since the device will not run true and smoothly when driven at high speeds, making it difficult to sand a surface smoothly. Also, if the drum runs eccentrically, undue stresses are set up which may cause damage to the sanding device or the drive shaft.

Having illustrated or described a preferred embodiment of the invention, it should be apparent to those skilled in the art that the invention permits of modification in arrangement and detail. I claim as my invention

I claim:

A sanding device comprising a drum having a relatively wide rim, a hub defining a circular aperture concentric with said rim, and a relatively thin web connecting said hub and said rim, said rim extending substantially equidistantly on the opposite sides of said web, said drum being divided diametrically into mating half sections, a cover for said drum comprising a strip of resilient rubber-like material secured to the periphery of said rim, said strip extending circumferentially of said rim from a mating edge of one drum half to the adjacent edge of the other drum half, said strip hinging said drum halves together, one face of said hub being frusto-conical, and a member to clamp said drum halves together including a tubular bushing portion fitting snugly within said aperture and an integral flange portion extending from said bushing portion and defining a clamping cone snugly engaging said hub one face.

References Cited in the file of this patent

UNITED STATES PATENTS

| | | |
|---|---|---|
| 232,333 | Buzzell | Sept. 21, 1880 |
| 613,079 | Ross | Oct. 25, 1898 |
| 733,577 | Catt | July 14, 1903 |
| 2,580,140 | Van Zomeren | Dec. 25, 1951 |
| 2,652,666 | Longbotham | Sept. 22, 1953 |